(No Model.) 2 Sheets—Sheet 2.
G. H. BENJAMIN.
UNDERGROUND PIPE OR CONDUIT FOR ELECTRICAL CONDUCTORS.
No. 302,883. Patented Aug. 5, 1884.
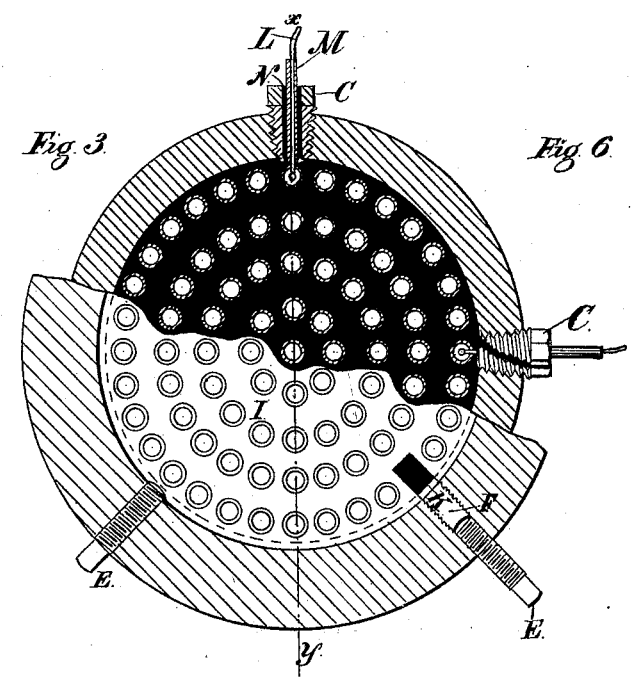
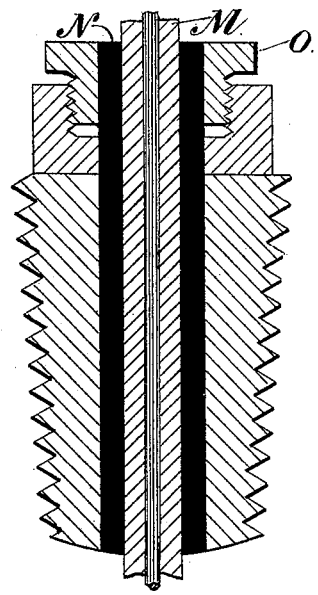
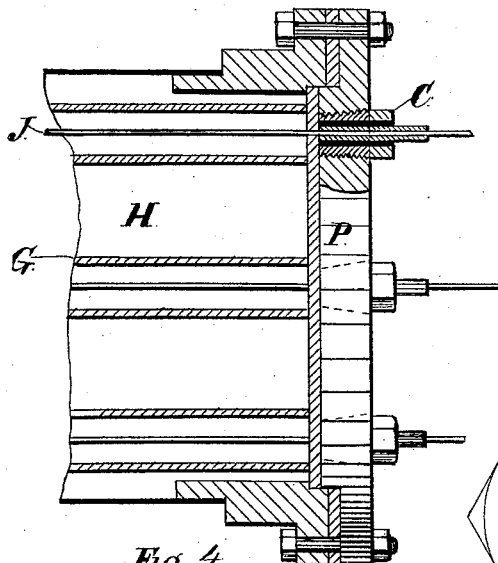
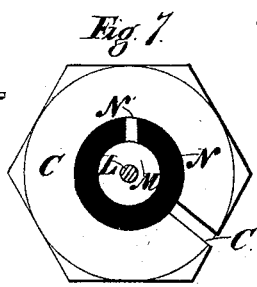
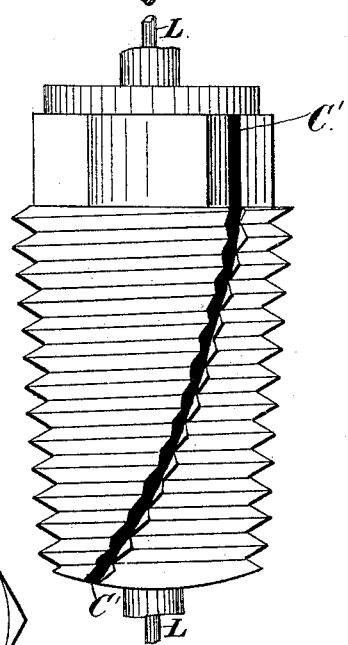
WITNESSES:
Wm A French
A. E. Saxton
INVENTOR
Geo H Benjamin
BY
Park Benjamin & Bro
his ATTORNEY'S

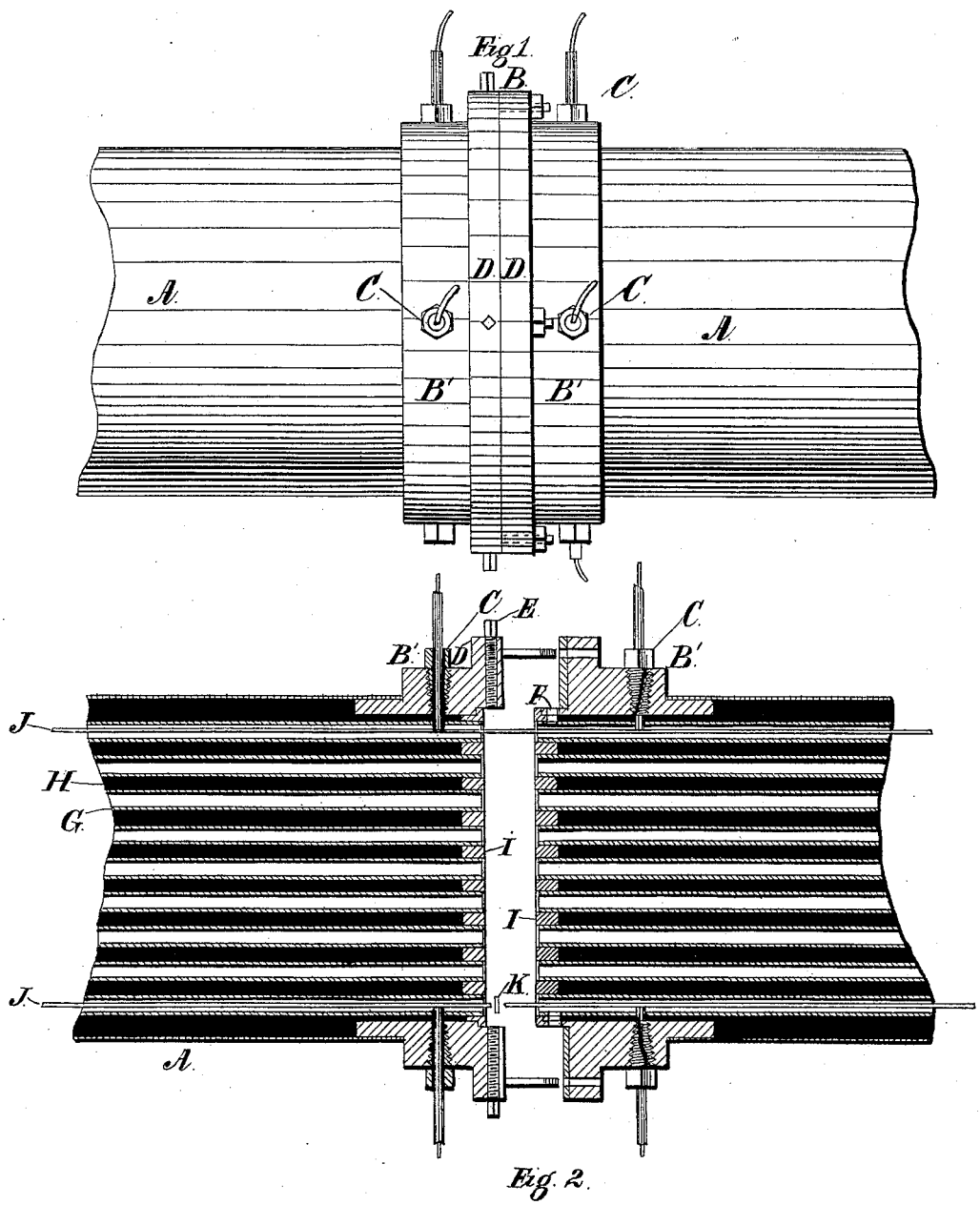

UNITED STATES PATENT OFFICE.

GEORGE H. BENJAMIN, OF SHORT HILLS, NEW JERSEY.

UNDERGROUND PIPE OR CONDUIT FOR ELECTRICAL CONDUCTORS.

SPECIFICATION forming part of Letters Patent No. 302,883, dated August 5, 1884.

Application filed January 8, 1884. (No model.)

*To all whom it may concern:*

Be it known that I, GEORGE H. BENJAMIN, of Short Hills, county of Essex, State of New Jersey, have invented certain new and useful Improvements in Underground Pipes or Conduits for Conveying Electrical Conductors, of which the following is a specification, reference being had to the accompanying drawings, forming a part thereof.

My invention relates to an underground conduit for wires or conductors of electrical currents, in which said wires are suitably insulated from each other and inclosed in a pipe.

My invention also has for its object to provide means whereby such wires can be wholly taken out of the inclosing pipe or conduit, or whereby a branch wire or wires can be connected to one or more of said inclosed wires without disturbing the body of the pipe or conduit or the other wires contained therein without breaking joints.

In the accompanying drawings, in which similar letters of reference represent like parts, Figure 1 is an exterior view of the pipe or conduit inclosing the wires or electrical conductors, showing the offsets of the coupling-boxes tapped and the wires leading therefrom. Fig. 2 is a longitudinal section taken through the line $x\,y$ of Fig. 3. Fig. 3 is a double transverse section taken on parallel planes, so as to show the hollow split conical tapping-plug and the straight plugs for dividing the wire. One of the last-mentioned plugs is shown partially removed, with a piece of insulating material inserted in its socket. Fig. 4 is a longitudinal section of the pipe or conduit with a transverse section of the cap or plate attached to the end thereof, as the same is to be used when the pipe or conduit is carried into a man-hole, testing-box, or station. Fig. 5 is an elevation of the hollow conical split plug. Fig. 6 is a longitudinal section of the conical plug, showing the relative positions of the wire, its covering, hard-rubber insulator, and the plug. Fig. 7 is a transverse section of the conical plug, rubber insulating-tube, and covered wire.

In the drawings, A is a pipe or tube, made preferably of sheet-iron or paper rolled in hot liquid asphalt. It can be made of any required diameter or length. In practice, length of fifteen feet will be found most convenient.

B B are the coupling-boxes for connecting the ends of the conduit-sections together, made of cast-iron, having flanges or projections D, the face of one flange being recessed to receive a projection on the face of the other flange. The boxes are bolted together, and may be attached to the pipe by rivets, shrinking, or in any well-known way. On the coupling-boxes are sleeves B', in which sleeves are tapped conical screw-threaded holes to receive the hollow conical split plug C.

C is a hollow conical plug, screw-threaded, and having a split or channel, C', cut through one side thereof or partially curved around the plug, as shown in Fig. 5. The object of cutting the plug through, as described, is that when said plug is inserted in the screw-threaded opening in the sleeve B' and firmly screwed down the diameter of the cylindrical opening in the plug is decreased and the rubber insulating-tube within the plug is compressed around the wire which is led through said plug, holding the same firmly.

The flanges or projections D on the coupling-boxes have a screw-threaded hole, F, tapped through them to receive the straight screw-threaded plugs E. These holes are made through both parts of the flanges D, so that when the said flanges are in contact the plug is inclosed by both of them.

G are the tubes containing the wires or electrical conductors, and can be made of any non-conducting material, but preferably of paper rolled in hot liquid asphalt.

H is the insulating material, placed between the wire-conveying tubes G and completely surrounding them. Various compounds can be used for this purpose, as a mixture of tar and asbestus, hydraulic cement, melted paraffine, &c. All of these compounds are, however, open to the objection that they are more or less affected by heat and cold. I therefore prefer to use a fine quality of mineral wool to surround the wire-conducting tubes. The particular method of applying the mineral is not herein shown or described, as I intend to make the same the subject of a separate application.

I I are disks of soft rubber attached to the faces of the coupling-boxes, and having holes provided to receive the ends of the tubes which convey the wires or electric conductors.

J J are the wires or electrical conductors, shown only in the outer tubes, the other tubes being represented as empty.

L L are branch conducting-wires connected to the wires J and passing through the split conical plugs. These wires L serve to convey the whole or a portion of the electric current from the main wire J. The branch conducting-wires are surrounded with an envelope, M, of lead or a suitable non-conducting substance.

N is a hard-rubber tube, closely fitting inside the split conical plug. This rubber tube is also split or divided on one side in manner similar to the plug which incloses it, so that it may be contracted upon the covering of the branch conducting-wire by the pressure exerted upon it by the split conical plug C.

O, Fig. 6, is a cap screw-threaded into the top of the conical plug, and is intended to be used to cover the top of the plug and rubber insulating-tube. When the main pipe or conduit terminates in a man-hole, testing-box, or station, the end is covered with an iron cap, P, as shown in Fig. 4. The conical split plugs are then tapped into the face of the said cap or plate, which is insulated from the pipe or conduit by the rubber I.

From the above description the arrangement of the various parts of the pipe or conduit, and also the means employed for taking out wires or connecting branch wires, will be readily understood.

In practically applying the device I prefer to have the sections of the pipe or conduit in length of from thirteen to fifteen feet, and of a sufficient diameter to allow the inclosed asphalted-paper tubes containing the conductors to be at least one-half of an inch apart, the intervening space to be filled with the non-conducting material. As the pipes or conductors are laid, the sections are bolted together by bolts passing through the flanges D, and in the conical tapped holes in the flanges B' of the coupling-boxes are placed solid conical screw-threaded plugs. The number of tapped holes in the flange may be equal to the number of wires contained in the outer circumferential row, so that any one or all of the wires may have branches connected to them, as desired. In arranging the wires in the pipe or conduit those intended to be used as through-wires between distant points should be placed in the center of the pipe, and those intended to supply local circuits in the outer circumferential row. Where it is desired to connect a branch wire to one of the wires of said outer row, the solid conical plug first inserted is removed. The insulating material between the internal surface of the main pipe and the paper conducting-tube is cut away, and a hole is then made through the paper tube which incloses the wire to be reached. The wire through which the branch current is to be carried may either have an ordinary insulating-covering or be inclosed in a lead pipe. The end of this wire, being denuded of its covering for a short distance, is carried through the split rubber insulating-tube contained in the hollow split conical plug, and is inserted into the aperture made in the main pipe until it meets the denuded line-wire, to which it may be soldered or electrically connected in any convenient way. Union having been made, the hollow conical split plug and rubber insulating-tube surrounding the branch wire are inserted into the conical tapped hole and screwed firmly down. It will be obvious that the more the plug is forced down the tighter it holds the rubber insulating-tube, which in its turn holds the covered branch conducting-wire. Melted paraffine is now poured into the hollow of the plug, so as to fill up any interstices, and the cap on top of the plug may then be affixed.

Where it is desired to carry out the whole current conveyed by a main wire—as, for example, the lowermost wire, T, Fig. 2—the cylindrical bolt E, Fig. 3, is removed, a cutting instrument is inserted in its socket, and the wire is thus divided. A piece of insulating material, K, Fig. 3, is next inserted, so as to separate the cut ends of the wire, and around this insulating material melted paraffine is poured. The plug is then reinserted and screwed firmly down. The conducting-wire leading out from the main wire thus cut is connected to the line in the manner already above described with reference to branch wires.

In laying the pipes or conduits it is usual to have man-holes or testing-boxes located at certain distances apart, and means must be provided whereby the wires can be tested, a portion of them diverted into a branch conduit, or defective wire removed. This is accomplished by means of the plate P, Fig. 4, which fits closely over the end of the pipe, and is provided with conical plugs, and openings arranged in said plate and in a line with the paper tubes conveying the electrical conductors. When a wire is connected to the main wire, the hollow conical split plugs are applied, as previously described.

I claim as my invention—

1. In combination with a pipe or conduit for conveying electrical conductors, two or more wire-conveying tubes contained therein, a plate or cap attached to the end of the pipe-section, a plate of insulating material located between the pipe and said plate, conical holes tapped through said plate in a line with the wire-conveying tubes, a hollow conical screw-threaded split plug adapted to fit said tapped holes, and a hard-rubber split insulating-tube within said hollow plug, substantially as described.

2. The combination, substantially as hereinbefore set forth, of the plate P, through which conical holes have been tapped, with the hollow conical screw-threaded split plug C, split hard-rubber insulating-tube N, and the plate of insulating material I.

3. The combination, substantially as hereinbefore set forth, of a pipe or conduit, a coupling-box attached to the end or ends thereof, two or more sleeves upon said coupling-box, conical and straight holes tapped through said sleeves, and a hollow conical screw-threaded split plug, and a straight screw-threaded plug adapted, respectively, to fit said tapped holes.

4. The combination, substantially as hereinbefore set forth, of a coupling-box, disk of insulating material attached to the faces of the adjacent coupling-flanges, two or more sleeves located upon the outside of the coupling-boxes, conical and straight holes tapped through said sleeves, hollow conical screw-threaded split plugs containing a hard-rubber split insulating-tube adapted to fit the conical tapped hole, and a straight screw-threaded plug to fit the straight hole.

5. The combination, substantially as hereinbefore set forth, of a main conducting-wire and the means whereby a portion of the current conveyed by said wire can be carried out of the inclosing pipe or conduit, consisting of the branch conducting-wire, the split rubber insulating-tube, and the hollow conical screw-threaded plug adapted to fit the conical hole tapped in the sleeve of the coupling-box.

6. The combination, substantially as hereinbefore set forth, of a main conducting-wire and the means whereby the whole of the current conveyed by said wire can be carried out at the inclosing pipe or conduit, consisting of a divided main conducting-wire having inserted between the divided ends thereof a piece of insulating material through the straight hole tapped in the sleeve of the coupling-box, said insulating material being held in its place by a straight screw-threaded bolt adapted to fit the tapped hole and the branch conducting-wire, the split rubber insulating-tube, the hollow conical split plug, and the conical hole tapped in the sleeve of the coupling-box.

7. A branch conducting-wire, L, in combination with the split rubber insulator N and the hollow conical screw-threaded split bolt C, substantially as described.

8. A branch conducting-wire, L, in combination with the split rubber insulator N, the hollow conical screw-threaded bolt C, and cap O, substantially as described.

9. The combination of the main inclosing-pipe A, interior conducting-pipes, G, the coupling-box B, having the sleeves thereon, B' D, tapped to receive the conical bolt C, and the straight bolt E, substantially as described.

10. The combination of the coupling-box B, having the sleeves B' and flange D thereon tapped to receive the conical bolt C, and the straight bolt E, substantially as described.

GEO. H. BENJAMIN.

Witnesses:
WM. A. FRENCH,
A. E. SAXTON.